No. 611,717. Patented Oct. 4, 1898.
N. SVENSON.
HORSESHOE WITH REMOVABLE CALKS.
(Application filed Jan. 8, 1897.)
(No Model.)
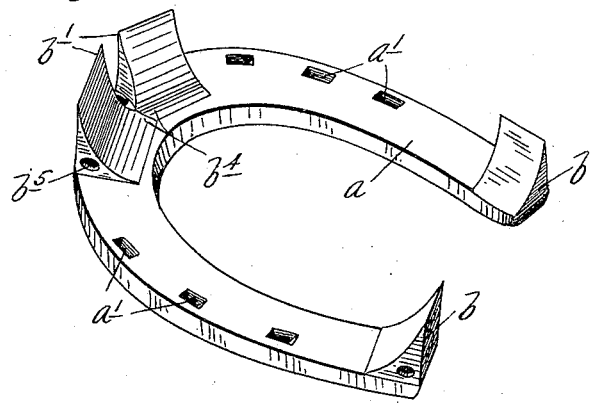
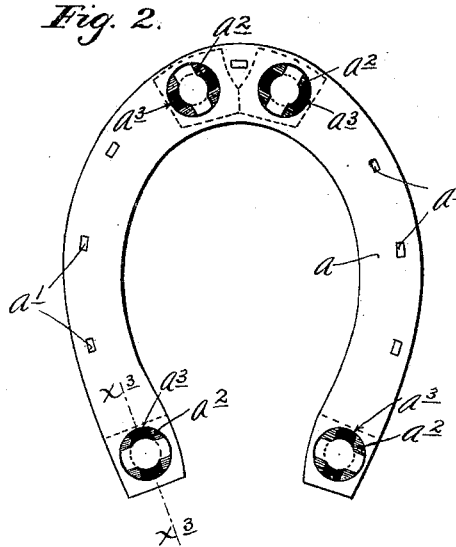
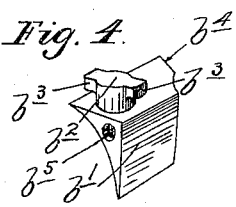
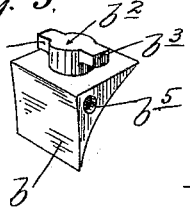
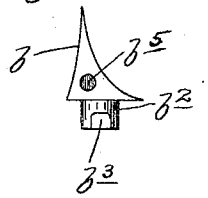
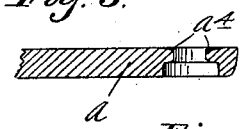
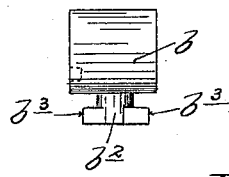
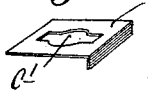
Witnesses
C. F. Kilgore
R. D. Merchant
Inventor
Nils Svenson.
By his Attorney
Jas. F. Williamson

UNITED STATES PATENT OFFICE.

NILS SVENSON, OF MINNEAPOLIS, MINNESOTA.

HORSESHOE WITH REMOVABLE CALKS.

SPECIFICATION forming part of Letters Patent No. 611,717, dated October 4, 1898.

Application filed January 8, 1897. Serial No. 618,490. (No model.)

*To all whom it may concern:*

Be it known that I, NILS SVENSON, a citizen of the United States, residing at Minneapolis, in the county of Hennepin and State of Minnesota, have invented certain new and useful Improvements in Horseshoes; and I do hereby declare the following to be a full, clear, and exact description of the invention, such as will enable others skilled in the art to which it appertains to make and use the same.

My invention has for its object to provide an improvement in horseshoes of that general type which are provided with removable calks.

To this end my invention consists of the novel devices and combinations of devices hereinafter described, and defined in the claims.

The preferred form of my invention is illustrated in the accompanying drawings, wherein like letters refer to like parts throughout the several views.

Figure 1 is a perspective view of a shoe constructed in accordance with my invention. Fig. 2 is a plan view of the hoof side of the shoe. Fig. 3 is a vertical section through a portion of the shoe, taken on the line $X^3 X^3$ of Fig. 2. Fig. 4 is a perspective view of one section of the toe-calk removed from the shoe. Figs. 5, 6, and 7 are views, respectively in perspective, side elevation, and rear elevation, showing one of the heel-calks removed from the shoe. Fig. 8 is a perspective view of a washer or take-up plate adapted for use in connection with the removable calks, and Fig. 9 is a tool by means of which the removable calks may be applied in working position on the shoe and removed therefrom.

$a$ indicates a horseshoe provided with the ordinary nail-holes $a'$. On its upper face or side which bears against the horse's foot the shoe $a$ is provided with countersunk seats $a^2$. As shown, the shoe is provided with four of these countersunk seats $a^2$, located one in each of the end prongs or heel portions of the shoe and two in the toe or bow portion of the shoe, which latter two seats are spaced apart from each other a short distance, one on each side of the said shoe. Elongated slots $a^3$ are cut through the shoe in each of the seats $a^2$.

$b$ indicates the removable heel-calks, and $b'$ the sections of the removable toe-calk, which calks $b$ and calk-sections $b'$ are provided with studs $b^2$, projecting from their upper or shoe-engaging faces. The studs $b^2$ are provided with lock-lugs $b^3$, which project therefrom in diametrically opposite directions and are spaced apart from the shoe-engaging surface of said calks a distance corresponding approximately to the thickness of the webs or flanged portions of the shoe left at the bottoms of the seats $a^2$. The under or working surfaces of the lugs $b^3$ are rounded at their corners, as best shown in Fig. 6, so as to insure the engagement of said lock-lugs with the flanges at the bottoms of the seats $a^2$, as will later appear.

The studs $b^2$ and lock-lugs $b^3$ are adapted to be inserted from the bottom of the shoe through the elongated slots $a^3$, and then by giving the calk or calk-section substantially a quarter-turn the lock-lugs $b^3$ may be forced into the seats $a^2$ and over the lock-flanges at the bottom thereof. The distance between the working faces of the calk or calk-sections should be such as to clamp the lock-flanges at the bottoms of the seats $a^2$ very tightly, and preferably so tightly that the said lock-lugs $b^3$ will be somewhat bent or strained, so as to hold the calks securely in their working positions. In other words, the distance between the inner or clamping surfaces of the lock-lugs $b^3$ and the base of the calk is slightly less than the thickness of the webs formed in the shoe at the bottoms of the countersunk seats $a^2$. With this construction, if the lock-lugs $b^3$ happen to be formed very heavy or of hardened steel, when the calks are turned to working position the said lock-lugs $b^3$ instead of bending will in some cases simply cut their way through the seat flanges or webs which they engage. It will be noted that the flange-engaging portions of the lock-lugs $b^3$ extend at right angles to the studs $b^2$ and approximately parallel to the base of the calk. Hence under the cutting action above described there will be no tendency to spread or cause the countersunk seats to bulge out laterally, as might be the case if the said lugs were beveled or rounded outward from the studs $b^2$. In this manner the calks may be firmly held to the shoe the first time they are placed in working position, but the second time the same calk is placed in working position it will not be so tightly held. Hence when a calk or calk-section is removed after having once been placed in working position in order to firmly secure the same in working position when replaced I provide the washer or take-up plate $c$, provided with an elongated slot $c'$, corresponding in shape and size to the slots $a^3$ of the shoe, which washer is placed over the stud $b^2$ next to the shoe-engaging face of the said calk or calk-section. In order to throw the frictional engagement between the shoe and the calks or calk-sections as far outward as possible from the pivotal centers of said calks or calk-sections, I preferably slightly bevel the edges of the slots $a^3$, as shown at $a^4$. This countersunk surface $a^4$ and the further fact that the space between the lugs $b^3$ and the body of the calk $b$ is slightly less than the web portion of the shoe engaged thereby, when the calk is in working position, causes the calk to draw with a yielding or spring action. In virtue of this special construction and action the calk will securely retain its position and may be repeatedly removed and replaced and nevertheless be made securely tight in working position. Of course the concavity to afford this action might be either on the shoe, as shown at $a^4$, or on the coöperating surface of the body portion $b$ of the calk. It is this special feature which makes the success of the shoe.

The toe calks or sections $b'$ are provided with coöperating stop projections $b^4$, which when the said sections $b'$ are forced to working positions, as shown in Figs. 1 and 2, are brought into engagement with each other to the rear of the dead-center or line through the center of the studs $b^2$. This engagement of the stop portions $b^4$ serves to positively prevent the adjacent portions of the sections $b'$ from being turned farther forward. It will also be noted by reference particularly to Figs. 2 and 4 that the stud portions $b^2$ of the toe-sections $b'$ are located eccentric to and outward from the centers of the said sections $b'$. In virtue of this construction the strain applied to the shoe when a horse is drawing a load will simply force the stop portions $b^4$ tightly together, but cannot possibly cause the said toe sections or calks $b'$ to turn from working position. It will also be noted that the sharpened edges of the toe-calk sections $b'$ stand at an angle to each other. This serves to prevent the toe of the shoe from slipping sidewise. It will also be noted that the heel-calks $b$ are positioned with their sharpened edges nearly at a right angle to each other. This of course further and positively prevents the shoe from slipping sidewise.

As shown, the calk-sections $b$ and $b'$ are each provided with a pin-seat $b^5$, with which a pin $f$ of a wrench $f'$ may be engaged. By means of this lever $f'$ the calks may be readily applied to the shoe and moved therefrom without removing the shoe from the horse's foot.

It will be understood, of course, that various alterations in the specific details above set forth may be made without departing from the spirit of my invention.

As is obvious, instead of beveling the under surfaces of the slots $a^3$ in the shoe $a$, as shown at $a^4$, the shoe-engaging faces of the calks and calk-sections might be formed with a slight concave, which would serve the same purpose—to wit, to throw the frictional points of contact outward from the pivotal centers of said calks or calk-sections. After the calks or calk-sections have been secured in working position on the shoe which is secured to the horse's hoof it will soon corrode or rust at the joint or point of contact with the shoe, so as to render its accidental removal practically impossible.

What I claim, and desire to secure by Letters Patent of the United States, is as follows:

1. The combination with the shoe $a$ provided with slotted seats spaced apart in the toe portion thereof, of the pair of removable toe-calk sections $b'$ provided with the studs $b^2$ located outward of their centers, the projecting lock-lugs $b^3$ on said studs $b^2$, and the stop portions $b^4$ projecting from said sections $b'$ and coöperating to limit the pivotal movements of said sections, substantially as described.

2. The combination with the shoe $a$ provided with the heel and toe calk seats $a^2$ with slots $a^3$, of the heel-calks $b$ and toe-calk sections $b'$, each provided with a projecting stud $b^2$ with lock-lug portions $b^3$, and said toe-calk sections $b'$ having also the coöperating stop portions $b^4$, substantially as described.

3. The combination with a horseshoe, having the countersunk lug-seats $a^2$ and the lug-passages $a^3$, of the calks $b$ having the lugs $b^3$ spaced apart from the bodies of the calks $a$ distance slightly less than the web of the shoe intended to be engaged thereby, and a concave surface on one of the coöperating parts, for permitting the calk and the shoe to be tightly drawn together under a yielding or spring action of the web engaged by the calk, substantially as and for the purposes set forth.

In testimony whereof I affix my signature in presence of two witnesses.

NILS SVENSON.

Witnesses:
F. D. MERCHANT,
H. SLETTEN.